Jan. 27, 1931.   N. TRBOJEVICH   1,790,609
GEAR CUTTER
Filed March 22, 1930   2 Sheets-Sheet 1
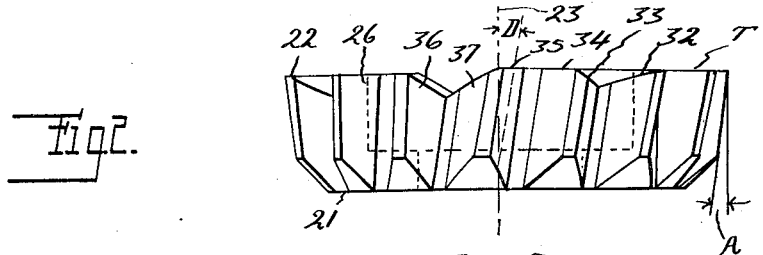
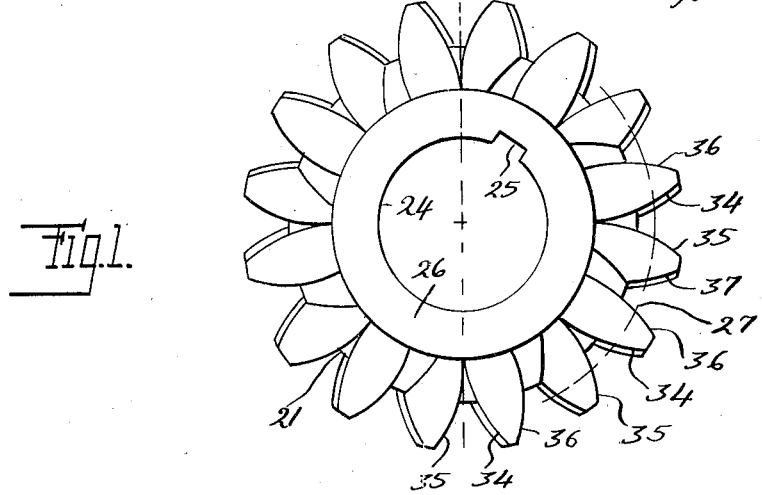
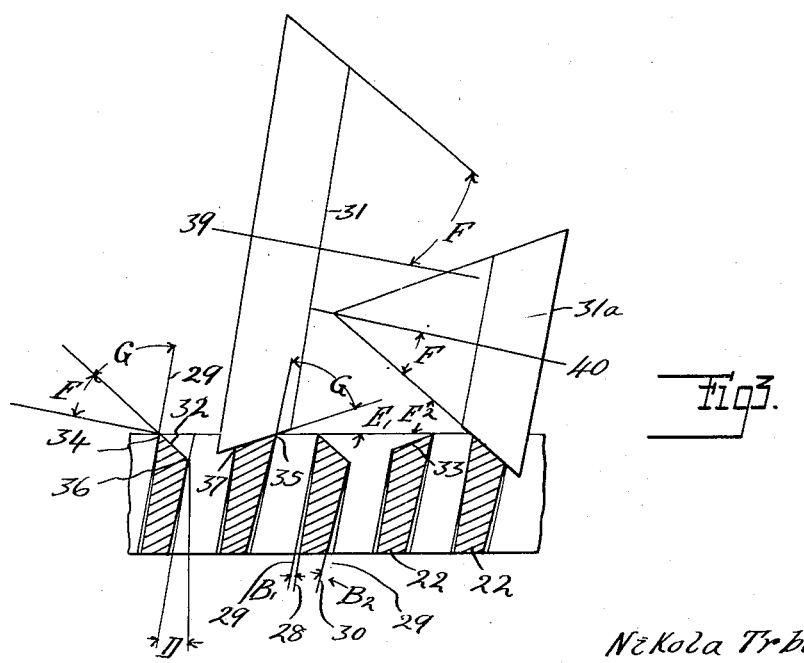
INVENTOR
Nikola Trbojevich
BY Whittemore Hulbert
Whittemore & Belknap
ATTORNEYS Jan. 27, 1931.  N. TRBOJEVICH  1,790,609
GEAR CUTTER
Filed March 22, 1930    2 Sheets-Sheet 2
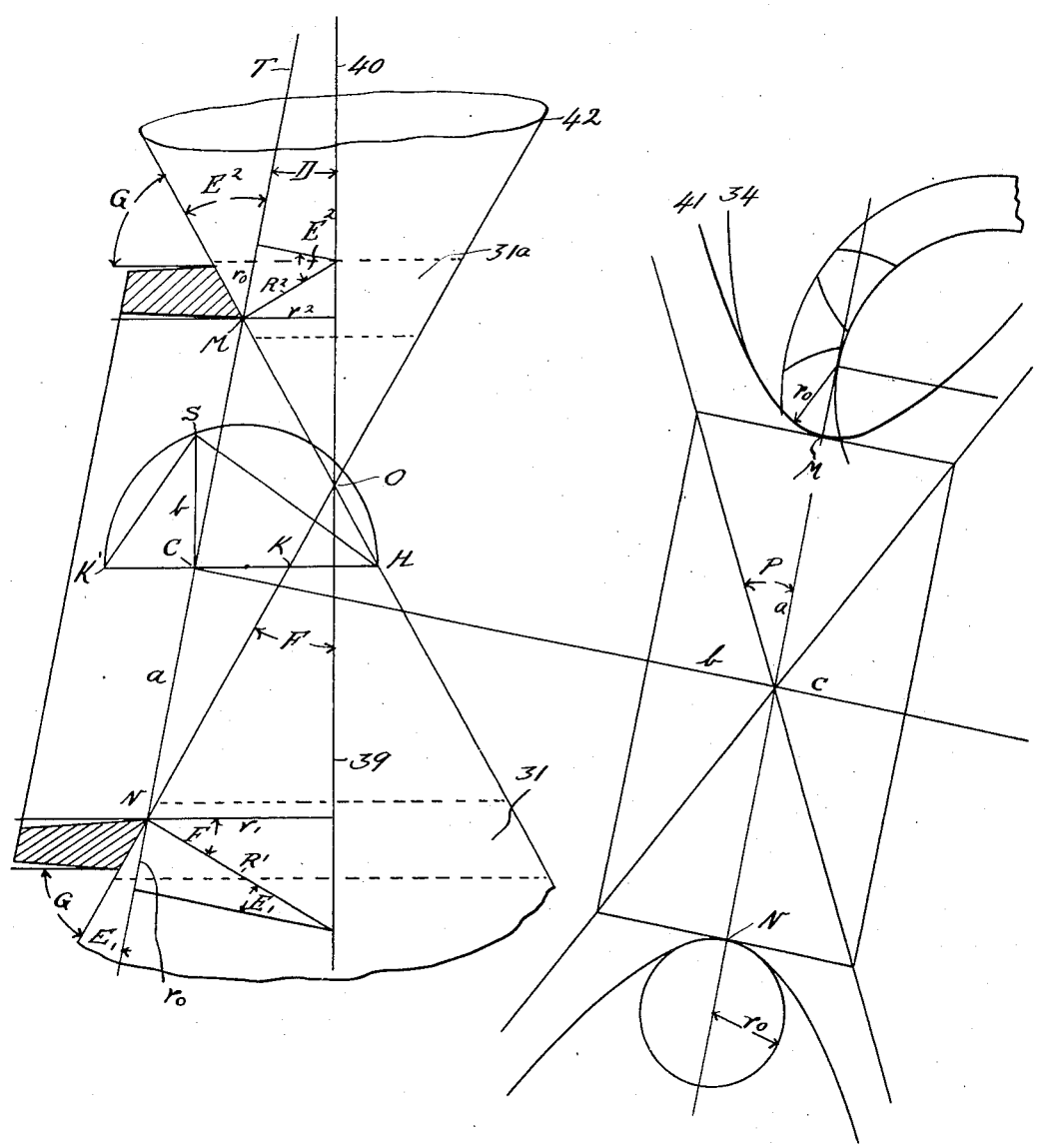
INVENTOR
Nikola Trbojevich
BY Whittemore Hulbert
   Whittemore Belknap
ATTORNEYS Patented Jan. 27, 1931

1,790,609

UNITED STATES PATENT OFFICE

NIKOLA TRBOJEVICH, OF DETROIT, MICHIGAN

GEAR CUTTER

Application filed March 22, 1930. Serial No. 438,143.

The invention relates to an improved involute helical cutter of the pinion type which may be used for generation of involute globoid worms or screws and also for generation of common or straight screws by means of a hobbing process.

This cutter is particularly intended to cut steering gear worms of a concave thread cross contour having an inverted involute tooth form. Such worms were first described in my co-pending applications for patent, Serial Nos. 277,693 filed May 14, 1928 and 346,232 filed March 11, 1929.

In manufacturing such worms I have discovered that an efficient cutting action is obtained in a hobbing machine when the top rakes of the cutting teeth are selected to be greater than the helix angle of the said teeth. Hence, I form the top surfaces of the cutting teeth in two alternating series, the first series to be inclined for a right-hand cutter, from left to right at an angle of the rake plus the helix angle, and the other series to be inclined from right to left at an angle of the rake minus the helix angle relative to a plane perpendicular to the axis of rotation.

One of the objects of this invention is to so form the cutting edges that they will lie substantially in the said plane perpendicular to the axis of rotation. By this means I am enabled to relieve the flanks of the cutting teeth with a great precision and in such a manner that all cutting edges will be, within very close limits, involutes developed from the same base circle after any number of repeated sharpenings.

A further object is to construct a cutter such that may be economically and yet accurately sharpened by means of two conical grinders. I have discovered a graphic method of determining the diameters and angles of the grinders used for such sharpening. It will be of interest to note that in this method of sharpening I approximate the involute (which is the cutting edge in this cutter) by means of a specially selected hyperbola, said curve in turn being the line of intersection of a cone with the cutting plane of the cutter.

In the drawings

Figure 1 is the plan view of my improved cutter;

Figure 2 is the side view thereof;

Figure 3 is a cross section of the cutting teeth taken along the pitch circle and developed in a plane indicating the alternating rakes and the relative positioning of the two conical grinders with respect to the cutter;

Figure 4 is a geometrical diagram showing the graphic method of selecting the grinder diameters which I discovered;

Figure 5 is the section of Figure 4 taken in the plane T and showing the hyperbola in its true size.

As shown in Figures 1 and 2 the new cutter is formed from a steel disk 21 and has a plurality of helical cutting teeth 22 arranged about its circumference and inclined at a predetermined helix angle D relative to the axis of rotation 23. The cutter is provided with a hole 24, a keyway 25 and a counterbore 26 for clamping purposes. The outer circumference of the cutter is conical thus leaving the cutting or top plane T of the cutter relieved for cutting, the clearance angle at the tops of the teeth being denoted with A, Figure 2, and being preferably selected from 7 to 10 degrees.

Figure 3 shows the plane development of the cutter taken along its pitch circle 27, Figure 1. The side relief of the cutting teeth is obtained in the conventional manner by grinding the flanks of teeth on their one side along a helix 28, said helix having a longer lead than the original tooth helix 29 and by grinding the remaining sides of teeth along a helix 30 of a shorter lead. This results in obtaining the side clearance angles $B'$ and $B^2$ respectively, said angles being selected from about two to two and a half degrees.

The tops of cutting teeth are ground by means of two conical grinders 31 and $31a$, respectively, by the sinking in process thereby forming the lip surfaces 32 and 33, both of which are concave and conical although each is of a different curvature and angle of inclination relative to the axis of rotation. Said lip surfaces preferably alternate from tooth to tooth all about the circumference of the cutter when the number of cutting teeth is even (e. g. 16 teeth as shown in Figure 1). However, when the number is odd the remaining tooth may be formed either to have both of its flanks finished to cut in the plane T, or it may conform to either one or the other series of alternate teeth or, again, it may be left out altogether.

The lip or body angles G of the cutting teeth are preferably of the same magnitude for both series and are selected from 60 to 75 degrees, a smaller angle for hard and tough materials and a greater angle for comparatively soft materials. The conical angle F of the grinders is usually a complement of the angle G so that G plus F equals ninety degrees. From this it follows that the axes 39 and 40 of the grinders 31 and 31a, respectively, are inclined at the same angle (the angle D) relative to the cutting plane T which fact renders the set-up of the grinding machine somewhat easier. The two rake angles $E_1$ and $E_2$ as measured from the cutting plane T are different from each other, their respective values being $$E_1 = F - D \text{ and } E_2 = F + D,$$

which explains why I select the angle F to be greater than the helix angle D as then, and only then will both $E_1$ and $E_2$ be positive or of the same "sense" relative to the cutting plane T.

The cutting edges of this cutter consist of two series of involutes 34 and 35, respectively, (Figure 1) each series being intended to cut on one side of the worm thread only. Said involutes are arranged in pairs of a V-shape lying substantially in the plane T in their entirety. The opposite tooth curves 36 and 37 respectively have obtuse lip or body angles and both are suppressed downwards from the cutting plane T for which reason they do not cut at all. This is readily seen from the fact that by the time the work reaches the said curves 36 and 37 it will already be finished by the preceding curves 34 and 35. However, I prefer to have those curves smoothly and accurately ground in my cutter as I have discovered that they are useful in preventing the chips from sliding downward past the cutter and work and thus damaging the already finished surfaces by clogging and scratching.

I have discovered that the cutter as above described may be practically obtained by grinding the lip surfaces with conical grinders of certain predetermined geometric characteristics. In order to obtain the desired geometric characteristics I have found it necessary to solve a new problem in geometry which is briefly this: Given two involutes 35 and 34, Figure 1, one right-handed and the other left-handed, but otherwise similar, find a hyperbola that will approximate the said involutes in its curvature, find the cones that will give the said hyperbola in the form of a conic section and further, determine the cones in such a manner that they will give in the cutting teeth a certain rake angle $E_1 = F - D$ for the first involute and another rake angle $E_2 = F + D$ for the second involute. While it is not necessary to approximate the involute very closely, on the other hand it is very desirable that the approximation be of the same degree and nature for both involutes as otherwise the generated screw or worm should have lopsided (non-symmetrical) teeth.

I proceed now to show the solution of this problem. First draw the double cone 42 having an axis 40, a vertex O and a conical angle F, Figure 4. Next draw a plane T inclined at an angle D relative to the cone axis. It is seen that by this arrangement part of the problem is already solved because first, the plane T intersects the cone 42 in a hyperbola and second, one branch of the said hyperbola is inclined relative to the side of the cone at the predetermined angle $E_1$ and the other at another angle $E_2$. A proper radius of curvature of the hyperbola will be obtained (to approximate the involute) by placing the plane T nearer to or farther from the vertex O, said plane T remaining parallel to itself in all such positions.

The points M and N represent the two apexes of the corresponding two branches of the hyperbola while the line MN bisected gives the point C, the center of the hyperbola. Thus $$NC = CM = a \quad (1)$$

where $a$ is the major half axis of the hyperbola.

The minimum radius of curvature $r_0$ is the same for both branches of the hyperbola and is found at the apexes M and N. We can determine the magnitude of the said radius of curvature graphically by using the rule of Meunier according to which the radii of curvatures of the plane sections of any surface vary as the cosines of the corresponding angles of intersection. Thus, at the point N, $r_1$ is the radius of the grinding circle, and $$R_1 = \frac{r_1}{\cos F} \quad (2)$$

is the normal or maximum radius of curvature of the cone. Further, $$r_0 = R_1 \sin E_1 \quad (3)$$

from which $$r_1 = \frac{r_0 \cos F}{\sin E_1} \quad (4)$$

and similarly, at the point M $$r_2 = \frac{r_0 \cos F}{\sin E_2} \quad (5)$$

which gives us the numerical values of the two grinding wheel diameters in the terms of $r_0$, F and D. In order to plot the hyperbola in Figure 5 it is necessary to determine either the minor half axis $b$ or the asymptote angle P. This may be done by calculation, or graphically. By calculation, we first take advantage of the fact known in geometry that the radius of curvature of a hyperbola at its apex is equal to one-half of its parameter, or $$r_0 = \frac{b^2}{a} \quad (6)$$

From Figure 4 we can write the equation $$r_1 - r_2 = 2a \sin D \quad (7)$$

Also from Figure 5 we can write $$\tan P = \frac{b}{a} \quad (8)$$

Taking the last five equations together and by substituting, eliminating and simplifying we obtain the formula for the asymptotic angle viz;

$$\cos P = \frac{\cos F}{\cos D} \quad (9)$$

A simple graphic method of obtaining the minor half axis $b$ is shown in Figure 4. This method of construction is based on certain remarks found in the "Analytic Geometry", Bailey & Woods, pages 153–154 and the lettering in Figure 4 corresponds to the similar lettering in their diagram page 154. Taking the formula from the said book $$KC \cdot HC = b^2 \quad (10)$$

We extend the line CH, Figure 4, and plot the point $K^1$ such that $$K^1C = KC.$$

We erect now upon the base $K^1H$ the right triangle $K^1SH$ and its height CS will be equal to the desired half axis $b$, because the equation 10 is thereby satisfied.

Thus, the procedure of finding the required grinder diameters may now be briefly summarized. The angles F, D, $E_1$ and $E_2$ are all known from the start. The radius $r_0$ is also known as it corresponds to the radius that best approximates the involute between its base and pitch radii as shown in Figure 5 and may be found either graphically or by calculation. The required grinding wheel radii $r_1$ and $r_2$ may now at once be computed from the equations 4 and 5 or they may be obtained graphically as was shown in Figure 4.

What I claim as my invention is:

1. A gear cutter comprising a plurality of equispaced and helically twisted cutting teeth disposed about an axis in a circle in which the tops of the cutting teeth are formed into two series of lip surfaces of a concave conical curvature, one lip surface for each tooth, said surfaces alternately varying as regard to their curvature and angle of inclination with respect to the cutter axis from tooth to tooth, the cutting edges of the teeth in the two series being on opposite sides respectively.

2. A gear cutter comprising a disk-shaped body and a plurality of cutting teeth disposed along a plurality of helixes, arranged in a circle and forming two series as regard to the formation of their lip surfaces, the arrangement being such that the said lips are of a concave conical curvature in both series and are inclined with respect to the axis of rotation from right to the left for one series and from left to the right for the other series.

3. A gear cutter for cutting of globoid worms comprising a plurality of uniformly twisted helical teeth, all inclined at a predetermined angle relative to the axis of rotation and arranged in a circle in which the cutting teeth are divided into two series, one series having curved cutting edges formed at the right flanks of the cutting teeth to cut on one side of the worm thread and the other series having curved cutting edges at their left sides to cut on the other side of the worm thread and in which the lip surfaces at the tops of the cutting teeth are concave and of a conical curvature and are inclined relative to the axes at a different angle for each series.

4. A gear cutter for cutting of globoid worms comprising a plurality of uniformly twisted helical teeth inclined at a predetermined angle relative to the axis of rotation and arranged in a circle in which the cutting teeth are divided in two series, each tooth of the first series having a single cutting edge in the form of an involute lying substantially in a plane perpendicular to the cutter axis and extending in a clockwise direction away from the base circle, and the other series has similar single involute cutting edges but running counter-clockwise, in which the tops of the cutting teeth are conical and concave in both series and are such as would be formed by sinking in a previously selected conical wheel into the cutting tooth in such a manner that the hyperbola formed by the intersection of the cutting plane perpendicular to the cutter axis with the said cone approximates the involute within predetermined limits and the lip angles formed by the intersection of the helicoidal flank surface of any one tooth with the cone are acute at all points of the cutting edges.

5. A helical gear cutter of the pinion type having a plurality of uniformly twisted teeth disposed about an axis in a circle in which the flanks of the cutting teeth are involute helicoidal surfaces having a longer lead of helix on one side of the teeth and a shorter lead on the other side of said teeth than the lead of the corresponding helical axes of the teeth, in which the circumference of the cutter is conical and divergent toward the cutting plane of the cutter and in which the top surfaces of the cutting teeth are conical and concave and so arranged that their inclination relative to the cutter axis alternately varies from tooth-to-tooth each time producing an acute cutting edge of an involute curvature lying in a plane perpendicular to the cutter axis, the said involutes running clockwise for one series of the alternate teeth and counter-clockwise for the other series.

6. A helical cutter of the pinion type used for generation of globoid worms comprising two series of lip surfaces adjacent to two corresponding series of cutting edges having an involute curvature and disposed in a plane perpendicular to the axis of the cutter in which the said lip surfaces are concave, conical and intersecting the said plane in two series of hyperbolas of a clockwise and a counter-clockwise curvature, thus approximating the said involutes within predetermined limits and producing two series of curved cutting edges which have an acute cutting angle at every point thereof.

7. A gear cutter comprising a plurality of equispaced and helically twisted teeth disposed about an axis in a circle, said teeth having curved flanks of an involute form as measured in a plane perpendicular to the said axis in which the tops of the cutting teeth are formed into two series of lip surfaces of a concave conical curvature and so arranged that all cutting edges are curved and lie substantially in a plane perpendicular to the axis, in which all lip angles are acute, are substantially equal for both series and their complement is greater than the helix angle of the cutter and in which the said lip surfaces have a different angle of inclination with respect to the axis and a different radius of curvature for each series.

In testimony whereof I affix my signature.

NIKOLA TRBOJEVICH.